United States Patent [19]

Arai et al.

[11] Patent Number: 5,244,938

[45] Date of Patent: Sep. 14, 1993

[54] ROOM TEMPERATURE CURABLE ORGANOPOLYSILOXANE COMPOSITION

[75] Inventors: Masatoshi Arai; Yoshifumi Inoue; Yoshio Inoue, all of Annaka, Japan

[73] Assignee: Shin-Etsu Chemical Co., Ltd., Tokyo, Japan

[21] Appl. No.: 806,342

[22] Filed: Dec. 13, 1991

[30] Foreign Application Priority Data

Dec. 14, 1990 [JP] Japan .................................. 2-410767

[51] Int. Cl.$^5$ .............................................. C08K 9/00
[52] U.S. Cl. ................................... 523/206; 523/209; 523/212; 524/12; 524/448; 524/431; 524/432; 524/783; 524/785; 524/789; 524/588; 525/104; 525/106; 528/18; 528/41; 528/42; 528/901
[58] Field of Search ..................... 528/18, 41, 42, 901; 524/588, 448, 431, 432, 783, 785, 789; 525/104, 106; 523/212, 206, 209

[56] References Cited

U.S. PATENT DOCUMENTS 5,180,771  1/1993  Arai et al. ............................. 528/18

FOREIGN PATENT DOCUMENTS 0392877  10/1990  European Pat. Off. .
3602490   8/1987  Fed. Rep. of Germany .

OTHER PUBLICATIONS

World Patents Index Latest, Jul. 31, 1991, 91-158425, & JP-A-3 091 564, Apr. 17, 1991.

*Primary Examiner*—Melvyn I. Marquis
*Attorney, Agent, or Firm*—Oblon, Spivak, McClelland, Maier & Neustadt

[57] ABSTRACT

The present invention is characterized by adding and mixing an organosilicon compound having alkoxy, groups and an ester linkage in the molecule represented by the following formula:

$$(H_3CO)_3-Si-\overset{\overset{\displaystyle CH_3}{|}}{C}HCOOC_2H_5$$

in an amount of 1 to 20 parts by weight per 100 parts by weight of a trifluoropropylalkylpolysiloxane. Said organosilicon compound has a function as a storage stabilizer as well as a curing agent and, according to the present invention, an RTV fluorosilicone composition that has hitherto been difficult to be applied as an adhesive for electric and electronic parts has been made possible to be used in the particular field.

6 Claims, No Drawings

ROOM TEMPERATURE CURABLE ORGANOPOLYSILOXANE COMPOSITION

BACKGROUND OF THE INVENTION

1. Field of the Invention

The present invention relates to a room temperature curing organopolysiloxane composition, and in particular to a dealcoholation type room temperature curable trifluoropropylmethylpolysiloxane composition (hereinafter referred to as an RTV fluorosilicone composition) excellent in storage stability and its cured product.

2. Description of the Prior Art

RTV fluorosilicone compositions are excellent in properties, for example, heat resistance, solvent resistance, and acid/base resistance. However, these compositions have a problem that the reactivity of the hydroxyl groups at the terminals of trifluoropropylmethylpolysiloxanes contained as a base polymer is lower than that of the hydroxyl groups at the terminals of dimethylpolysiloxane. Further, there is a problem that the siloxane bond may break under basic conditions. Consequently, these RTV fluorosilicone compositions are available as products only in the form of acidic acetic acid-elimination type RTV fluorosilicone compositions wherein the curing agent is high in reactivity. As a result, the compositions have a defect that they have an irritating order of acetic acid and are strongly corrosive, and therefore the application thereof in electric and electronic industry is restricted.

Further, alcohol removal type RTV silicone compositions have defects that the curing speed is slow and the internal curability and the storage stability are poor and they have a problem that if they are kept for a long period of time even under water-free conditions, they do not cure when used.

On the other hand, an alcohol removal type RTV silicone composition good in storage stability is disclosed in Japanese Pre-examination Patent Publication (kokai) No. 47868/1991. This composition uses, as a so-called alcohol scavenger, an organosilicon compound having a group represented by the following general formula (2):

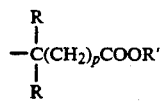

wherein R represents a hydrogen atom, a methyl group, or an ethyl group, R' represents a monovalent hydrocarbon group, and p is an integer of 1 to 3.

However, since the alcohol scavenger disclosed in the above prior art needs to use a basic organosilicon compound as a catalyst, this scavenger cannot be applied to RTV fluorosilicone compositions. That is, this is because the basic organosilicon compound used as a catalyst causes the polysiloxane chain to crack, leading to failure in curing.

SUMMARY OF THE INVENTION

Therefore an object of the present invention is to provide a quick-curing alcohol removal type RTV silicone composition excellent in storage stability, particularly an alcohol removal type fluorosilicone composition and its cured product.

The present invention has succeeded in attaining the above object based on a new finding that an organosilicon compound having a special structure with alkoxy groups and an ester linkage in the molecule has a dual function as a storage stabilizer and a curing agent.

Thus, according to the present invention, there is provided a room temperature organopolysiloxane composition, comprising (A) a diorganopolysiloxane having a hydroxyl group or 2 or 3 alkoxy groups at each of the both ends of its molecular chain, (B) a filler, (C) an organosilicon compound represented by the following general formula (1):

wherein $R^1$ and $R^2$, which may be the same or different, each represent a hydrogen atom or an alkyl group, $R^3$ represents a substituted or unsubstituted monovalent hydrocarbon group having 1 to 10 carbon atoms, $R^4$ represents an alkyl group or an alkoxyalkyl group, a is 0 or 1, and n is an integer of 0 to 3, and (D) an organotin compound.

The present composition is stable under sealed conditions, but, when exposed to air, cures quickly due to the moisture present therein to form an elastic body. Since the composition is excellent in storage stability and curability, for example, even after six months of storage, when the composition is exposed to air, it cures quickly to give a cured product excellent in physical properties.

The present invention exhibits a particularly excellent effect particularly when, as the organopolysiloxane (A) that is the base component, a trifluoropropyltrimethylsiloxane is used to form an RTV fluorosilicone composition. That is, the RTV fluorosilicone composition is as described above excellent in storage stability and curability, does not release a toxic or corrosive gas at the time of curing, and does not cause the surface treated therewith to rust and its cured product adheres well to various substrate materials, particularly to metals. Therefore according to the present invention, an RTV fluorosilicone composition and its cured product that have been conventionally difficult to be applied as an adhesive to electronic and electric parts have been made possible to be used in the particular field.

DETAILED DESCRIPTION OF THE INVENTION

(A) Diorcanooolvsiloxanes

The diorganopolysiloxane that is the component (A) constituting the present composition is a major agent of the composition and includes one represented, for example, by the following average composition formula:

wherein $R^5$ groups independently each represent a substituted or unsubstituted monovalent hydrocarbon group, b is a number of 1.90 to 2.05, and the molecular chain have a hydroxyl group or 2 or 3 alkoxy groups at each end thereof.

Examples of $R^5$ include unsubstituted or substituted monovalent hydrocarbon groups having 1 to 10 carbon atoms, preferably 1 to 8 carbon atoms, such as an alkyl group, for example, a methyl group, an ethyl group, a propyl group, a butyl group, a 2-ethylbutyl group, and an octyl group, a cycloalkyl group, for example, a cyclohexyl group and a cyclopentyl group, an alkenyl group, for example, a vinyl group, an allyl group, and a hexenyl group, an aryl group, for example, a phenyl group, a tolyl group, a xylyl group, a naphthyl group, and a diphenyl group, an aralkyl group, for example, a benzyl group and a phenylethyl group, or groups derived from these groups by replacing part or all of the hydrogen atoms attached to these groups by a halogen atom(s), a cyano group(s), or the like, for example, a chloromethyl group, a trifluoropropyl group, a 2-cyanoethyl group, and a 3-cyanopropyl group.

Particularly, the present invention is quite effective as an RTV fluorosilicone composition and therefore among the above diorganopolysiloxanes, a trifluoropropylalkylpolysiloxane represented by the following general formula (3) or (4):

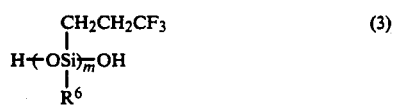

(3)

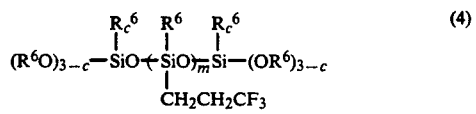

(4)

wherein $R^6$ represents an alkyl group having up to 6 carbon atoms, preferably a methyl group, c is 0, 1, or 2, and m is a positive integer, is most preferably used.

Further the cured product obtained from the present composition exhibits a good rubberlike elasticity and, in order to make the mechanical strength excellent, preferably the viscosity of the component (A) at 25° C. is 25 cSt or over. Therefore, out of the above diorganopolysiloxanes, those having a degree of polymerization which exhibits such a viscosity are preferably used.

(B) Fillers

The filler that is the component (B) in the present composition may be those known per se and includes, for example, finely divided silica, silica aerogel, precipitated silica, diatomaceous earth, metal oxides such as iron oxide, zinc oxide, and titanium oxide, products obtained by treating the surface of these with a silane, asbestos, glass wool, carbon black, finely divided mica, fused silica powder, and synthetic resin powders, for example, of polystyrene, polyvinyl chloride, and polypropylene.

The amount of the component (B) to be blended is 1 to 400 parts by weight, particularly preferably 5 to 200 parts by weight, per 100 part by weight of the component (A). If the amount is less than 1 part by weight, there is a tendency that the cured product obtained from the composition does not exhibit a sufficient mechanical strength. If the amount exceeds 400 parts by weight, the viscosity of the composition increases, which not only makes the workability worsen but also lowers the rubber strength after the curing, so that an intended rubberlike elastic matter is hardly obtainable in some cases.

(C) Organosilicon Compounds

In the present invention, it is quite important to use an organosilicon compound represented by the general formula (1):

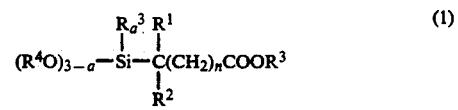

(1)

wherein $R^1$ to $R^4$, a, and n have the same meanings as defined above. That is, this organosilicon compound has an advantage that the reactivity of its Si—C bond is very high. Accordingly, without the use of a basic organosilicon compound as used in the above-mentioned Japanese Pre-examination Patent Publication (kokai) No. 47868/1991 as a catalyst, the organosilicon compound reacts with moisture in the filler or, for example, with the hydroxyl groups in the trifluoropropylmethylpolysiloxane that is the component (A) which are low in reactivity to silylate them. This silylation reaction is represented, for example, by the following equation (5):

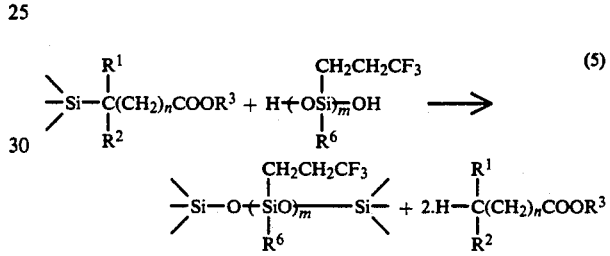

(5)

Thus, this organosilicon compound acts as a curing agent as well as a storage stabilizer by uptaking moisture in the composition. Further, in this case, since acid components such as acetic acid are not produced concomitantly, the problem of corrosion of metals, etc. will not occur.

In the above general formula (1), groups $R^1$ and $R^2$ may be the same or different and each represent a hydrogen atom or an alkyl group. The alkyl group is preferably a lower alkyl group having up to 6 carbon atoms such as a methyl group and an ethyl group.

The substituted or unsubstituted monovalent hydrocarbon group $R^3$ has 1 to 10 carbon atoms, preferably 1 to 8 carbon atoms, and specific examples thereof include an alkyl group such as a methyl group, an ethyl group, a butyl group, a pentyl group, a hexyl group, a heptyl group, and an octyl group, a cycloalkyl group such as a cyclohexyl group, an aryl group such as a phenyl group, and groups formed by replacing part or all of the hydrogen atoms of these groups by a halogen atom(s) such as a chlorine atom(s), with an alkyl group being particularly preferable.

Examples of the group $R^4$ include an alkyl group having 1 to 8 carbon atoms such as a methyl group, an ethyl group, a propyl group, a butyl group, and an octyl group and an alkoxyalkyl group having 1 to 8 carbon atoms as a methoxymethyl group, a methoxyethyl group, an ethoxymethyl group, and an ethoxyethyl group, with a methyl group and an ethyl group being preferable.

Further, n is an integer of 0 to 3, preferably 0 or 1.

Specific examples of the above organosilicon compound are compounds represented by the following formulae, wherein Me, Et, Pr, and Bu stand for a methyl group, an ethyl group, a propyl group, and a butyl group, respectively.

(MeO)₃SiCH₂COOMe, (MeO)₃SiCH₂COOEt, (MeO)₃SiCH₂COOPr, (MeO)₃SiCH₂COOn-C₈H₁₇, (MeO)₃SiCH₂COO—⟨C₆H₅⟩, (MeO)₃SiCH₂COO—⟨C₆H₁₁⟩, (MeO)₂SiCH₂COOMe, (MeO)₂SiCH₂COOEt,
        |Me                  |Me (MeO)₂SiCH₂COOPr, (MeO)₂SiCH₂COOC₈H₁₇,
        |Me                  |Me (MeO)₂SiCH₂COO—⟨C₆H₅⟩,
        |Me (MeO)₂SiCH₂COO—⟨C₆H₁₁⟩,
        |Me (EtO)₃SiCH₂COOMe, (EtO)₃SiCH₂COOEt, (EtO)₃SiCH₂COOPr, (EtO)₃SiCH₂COOBu, (EtO)₃SiCH₂COO—⟨C₆H₅⟩, (MeO)₃SiCH₂COOn-C₈H₁₇, (MeO)₃SiCHCOOMe, (MeO)₃SiCHCOOEt,
        |Me              |Me (MeO)₃SiCHCOOPr, (MeO)₃SiCHCOOBu,
        |Me              |Me (MeO)₃SiCHCOOn-C₈H₁₇, (MeO)₃SiCHCOO—⟨C₆H₅⟩,
        |Me                    |Me (MeO)₂SiCHCOOMe, (MeO)₂SiCHCOOEt,
 |Me    |Me        |Me    |Me (MeO)₂SiCHCOOPr, (MeO)₂SiCHCOOBu,
 |Me    |Me        |Me    |Me (MeO)₂SiCHCOOC₈H₁₇, (MeO)₂SiCHCOO—⟨C₆H₅⟩,
 |Me    |Me           |Me    |Me (MeO)₂SiCHCOOMe, (MeO)₂SiCHCOOEt,
 |⟨C₆H₅⟩  |Me       |⟨C₆H₅⟩  |Me (MeO)₂SiCHCOOMe, (EtO)₃SiCHCOOMe,
 |Et    |Me         |Me (EtO)₃SiCHCOOEt, (EtO)₃SiCHCOOPr,
 |Me              |Me (EtO)₃SiCHCOOBu, (EtO)₃SiCHCOOC₈H₁₇,
 |Me              |Me (EtO)₃SiCHCOO—⟨C₆H₅⟩, (EtO)₂SiCHCOOMe,
 |Me                    |Me    |Me (EtO)₂SiCHCOOEt, (EtO)₂SiCHCOOPr,
 |Me    |Me        |Me    |Me (EtO)₂SiCHCOOMe, (EtO)₂SiCHCOOEt,
 |⟨C₆H₅⟩  |Me       |Et    |Me (MeO)₃SiCHCOOMe, (MeO)₃SiCHCOOEt,
 |Et              |Et (MeO)₂SiCHCOOMe, (BuO)₃SiCH₂COOMe,
 |Me    |Et (BuO)₃SiCHCOOEt, (C₈H₁₇O)₃SiCH₂COOMe,
 |Me (C₈H₁₇O)₃SiCHCOOEt,
       |Me (MeO)₃SiCH₂CH₂COOMe, (MeO)₃SiCH₂CH₂COOEt, (MeO)₃SiCHCH₂COOMe, (MeO)₃SiCHCH₂COOEt,
        |Me                  |Me (MeO)₃SiCH₂CH₂CH₂COOMe, (MeO)₃SiCH₂CH₂CH₂COOEt, (EtO)₃SiCH₂CH₂CH₂COOMe and (EtO)₃SiCH₂CH₂CH₂COOEt In the present invention, the above-mentioned organosilicon compound represented by the general formula (1) is produced by the method known per se and preferably is blended in an amount of 1 to 20 parts by weight, particularly 1 to 10 parts by weight, per 100 parts by weight of the organopolysiloxane that is the component (A). If the amount is less than 1 part by weight, the intended effect is not obtained adequately, while if the amount exceeds 20 parts by weight, the effect is not increased and therefore it is uneconomically disadvantageous.

(D) Organotin Compounds

In the present composition, the organotin compound used as the component (D) is one known as a condensation reaction catalyst conventionally used in this kind of composition and for example use is made of a carboxylate such as tin naphthenate, tin caprate, and tin oleate, dibutyl tin diacetate, dibutyl tin dioctoate, dibutyl tin dilaurate, dibutyl tin dioleate, diphenyl tin diacetate, dibutyl tin oxide, dibutyl tin dimethoxide, dibutylbis(triethoxysiloxy)tin, and dibutyl tin benzylmalate.

The amount of the component (D) to be blended is 0.01 to 10 parts by weight, preferably 0.1 to 2 parts by weight, per 100 parts by weight of the component (A).

If the amount of the component (D) is too small, the function as a curing catalyst is not exhibited satisfactorily, so that the curing time becomes longer and the curing in the deep part of the rubber becomes insufficient.

Further, if the amount of the component (D) is excessive, the storage stability of the composition lowers.

Preparation of the Composition

The present composition can be prepared by mixing the above components (A) to (D).

Optionally, to the present composition, conventionally known various additives can be added such as a thixotropic agent such as polyethylene glycol and its derivative, a pigment, a dye, an age resister, an antioxidant, an antistatic agent, a fire retardant such as antimony oxide and a chlorinated paraffin, a thermal conductivity improver such as boron nitride and aluminum oxide, an adhesiveness-imparting agent, a so-called carbon functional silane having an amino group, an epoxy group, a thiol group, or the like, a metal salt of a carboxylic acid, and a metal alcoholate. Further, the composition may be diluted, for example, with a hydrocarbon solvent such as toluene and petroleum ether, a ketone, or an ester in view, for example, of the workability at the time of use.

The above-mentioned organosilicon compound of the general formula (1) has a function as a curing agent and a function as a storage stabilizer as well as a function as a scavenger. Therefore, as a curing agent, an alkoxysilane or its partially hydrolyzed product can be added in the range which does not injure the object of the present invention, for example, in an amount of 20 parts by weight or less, particularly in an amount ranging between 0.5 and 10 parts by weight, per 100 parts by weight of the component (A). Examples of such an alkoxysilane include methyltrimethoxysilane, vinyltrimethoxysilane, phenyltrimethoxysilane, tetramethoxysilane, methyltriethoxysilane, vinyltriethoxysilane, and phenyltriethoxysilane.

The present composition is easily cured with moisture in air to form a rubberlike elastic cured product.

EXAMPLES

Now, the present invention will specifically be described with reference to Examples, wherein "parts" represent parts by weight and the viscosity was measured at 25° C.

EXAMPLE 1

10 parts by weight of fumed silica whose surface had been treated with a dimethyldichlorosilane was added to 100 parts of a trifluoropropylmethylpolysiloxane (viscosity: 15,000 cP) each end of the molecular chain of which is blocked with a hydroxyl group and they were mixed uniformly to prepare a base compound.

Then, 7 parts of a silyl acetate represented by the following formula:

and 0.2 part of dibutyl tin dimethoxide were added to 100 parts of the base compound and they were stirred under reduced pressure for 10 min with moisture being cut off thereby preparing an RTV fluorosilicone composition.

Then, when this composition was extruded into a sheet having a thickness of 2 mm and was exposed to air at 23° C. and 55% RH, the sheet dried to the touch in 7 min.

Physical properties of a cured product obtained by allowing the sheet to stand for 7 days under the same atmosphere are shown in Table 1. Physical properties of a sheet having a thickness of 2 mm obtained from the above composition which was placed in a sealed container and was allowed to stand at a temperature of 70° C. for 7 days and physical properties of a sheet having a thickness of 2 mm obtained from the above composition which was placed in a sealed container and was allowed to stand at a temperature of 23° C. for 6 months are also shown in Table 1.

From the results shown in Table 1, it was confirmed that the above composition was excellent in storage stability and physical properties of the cured product obtained from the composition which had been stored were excellent.

TABLE 1

| | Physical properties of the cured products* | | | |
|---|---|---|---|---|
| | Time required for dry tack (min) | Hardness | Elongation (%) | Pulling strength (kg · cm²) |
| Initial physical properties | 7 | 31 | 310 | 29 |
| After storage at 70° C. for 7 days | 7 | 30 | 310 | 29 |
| After storage at 23° C. for 6 months | 7 | 30 | 310 | 29 |

Remarks:
Physical properties of the cured products were measured in accordance with JIS K 6301.

EXAMPLES 2 TO 6 AND COMPARATIVE EXAMPLES 1 TO 4

In each of Examples and Comparative Examples, the organic tin compound shown in Table 2 and the silane compound represented by the above general formula (1) shown in Table 2 were added in amounts shown in Table 2 to 100 parts of the base compound prepared in Example 1 and they were mixed and processed in the same manner as in Example 1 to prepare a composition. A sheet having a thickness of 2 mm of this initial composition, a sheet having a thickness of 2 mm of the composition which had been stored at 70° C. for 7 days; and a sheet having a thickness of 2 mm of the composition which had been stored at 23° C. for 6 months were prepared and cured at 23° C. under an atmosphere of 55% RH and room temperature. Physical properties of the thus obtained cured products were examined by the method in accordance with JIS K-6301 and results shown in Table 2 were obtained.

TABLE 2

|  | Examples | | | | |
|---|---|---|---|---|---|
|  | 2 | 3 | 4 | 5 | 6 |
| Composition (parts) | | | | | |
| Base compound | 100 | 100 | 100 | 100 | 100 |
| (MeO)$_3$SiCH$_2$COOEt | 7 | — | — | — | — |
| (MeO)$_3$SiCH(Me)COOMe | — | 7 | 4 | — | — |
| (EtO)$_3$SiCH(Me)COOEt | — | — | — | 6 | — |
| (EtO)$_2$Si(Me)CH(Me)COOBu | — | — | — | — | 3 |
| Dibutyl tin dimethoxysilane | 0.3 | 0.2 | 0.2 | — | 0.2 |
| Dibutyl tin dilaurate | — | — | — | 0.3 | — |
| Vinyltrimethoxysilane | — | — | 3 | — | 4 |
| γ-tetramethylguanidyl-propyltrimethoxysilane | — | — | — | — | — |
| Initial physical properties | | | | | |
| Time required for getting to the touch (min) | 7 | 7 | 7 | 7 | 7 |
| Hardness | 30 | 29 | 31 | 30 | 29 |
| Elongation (%) | 310 | 320 | 320 | 310 | 310 |
| Pulling strength (kg/cm$^2$) | 29 | 28 | 29 | 29 | 30 |
| After storage at 70° C. for 7 days | | | | | |
| Time required for getting dry to the touch (min) | 7 | 8 | 8 | 7 | 7 |
| Hardness | 30 | 30 | 31 | 29 | 29 |
| Elongation (%) | 310 | 320 | 310 | 310 | 310 |
| Pulling strength (kg/cm$^2$) | 29 | 29 | 29 | 30 | 28 |
| After storage at 23° C. for 6 months | | | | | |
| Time required for getting dry to the touch (min) | 8 | 7 | 7 | 8 | 7 |
| Hardness | 30 | 29 | 29 | 29 | 30 |
| Elongatin (%) | 310 | 300 | 300 | 310 | 310 |
| Pulling strength (kg/cm$^2$) | 30 | 29 | 29 | 31 | 30 |

|  | Comparative Examples | | | |
|---|---|---|---|---|
|  | 1 | 2 | 3 | 4 |
| Composition (parts) | | | | |
| Base compound | 100 | 100 | 100 | 100 |
| (MeO)$_3$SiCH$_2$COOEt | — | — | 7 | — |
| (MeO)$_3$SiCH(Me)COOMe | — | — | — | — |
| (EtO)$_3$SiCH(Me)COOEt | — | — | — | — |
| (EtO)$_2$Si(Me)CH(Me)COOBu | — | — | — | 3 |
| Dibutyl tin dimethoxysilane | 0.2 | — | 0.3 | — |
| Dibutyl tin dilaurate | — | 0.2 | — | 0.2 |
| Vinyltrimethoxysilane | 7 | 7 | — | 4 |
| γ-tetramethylguanidyl-propyltrimethoxysilane | — | 0.5 | 0.5 | 0.5 |
| Initial physical properties | | | | |
| Time required for getting dry to the touch (min) | 7 | 7 | 7 | 7 |
| Hardness | 29 | 30 | 30 | 30 |
| Elongation (%) | 300 | 290 | 310 | 300 |
| Pulling strength (kg/cm$^2$) | 30 | 27 | 29 | 29 |
| After storage at 70° C. for 7 days | | | | |
| Time required for getting dry to the touch (min) | Failure in curing | Failure in curing | Failure in curing | Failure in curing |
| Hardness | | | | |
| Elongation (%) | | | | |
| Pulling strength (kg/cm$^2$) | | | | |
| After storage at 23° C. for 6 months | | | | |
| Time required for getting dry to the touch (min) | Failure in curing | Failure in curing | Failure in curing | Failure in curing |
| Hardness | | | | |
| Elongatin (%) | | | | |
| Pulling strength (kg/cm$^2$) | | | | |

EXAMPLE 7

8 parts of fumed silica whose surface had been treated with a cyclic dimethypolysiloxane was added to 100 parts of a trifluoropropylmethylpolysiloxane (viscosity: 50,000 cP) each end of the molecular chain of which has three methoxy groups and they were mixed uniformly to prepare a base compound.

Then, 3 parts of a silane compound represented by the following formula:

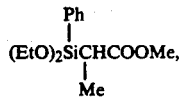

wherein Ph represents a phenyl group, and 0.3 part of dibutyl tin dimethoxide were added to 100 parts of the base compound and they were stirred for 15 min with moisture being cut off thereby preparing an RTV fluorosilicone composition.

Then, using this base composition, similarly to Example 1, sheets having a thickness of 2 mm were formed immediately after the preparation of the composition, after the storage of the composition at 70° C for 7 days, and after the storage of the composition at 23° C for 6 months, and physical properties of the cured products obtained by treating them in the same way as Example 1 are shown in Table 3.

TABLE 3

| Physical properties of the cured products* | | | | |
|---|---|---|---|---|
|  | Time required for getting dry to the touch (min) | Hardness | Elongation (%) | Pulling strength (kg · cm$^2$) |
| Initial physical properties | 5 | 24 | 280 | 25 |
| After storage at 70° C. for 7 days | 5 | 23 | 270 | 24 |
| After storage at 23° C. for 6 months | 5 | 24 | 280 | 25 |

We claim:

1. A room temperature curable organopolysiloxane composition, consisting essentially of, by weight,
    (A) 100 parts of a diorganopolysiloxane having a hydroxy group or 2 or 3 alkoxy groups at each of the both ends of its molecular chain,
    (B) 1 to 400 parts of a filler,
    (C) 1 to 20 parts of an organosilicon compound represented by the following general formula (1):

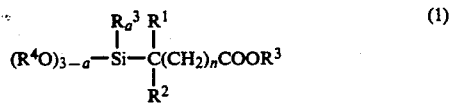

wherein R$^1$ and R$^2$, which may be the same or different, each represent a hydrogen atom or an alkyl group, R$^3$ represents a substituted or unsubstituted monovalent hydrocarbon group having 1 to 10 carbon atoms, R$^4$ represents an alkyl group or an alkoxyalkyl group, a is 0 or 1, and n is an integer of 0 to 3, and
    D) 0.01 to 10 parts of an organotin compound cayalyst.

2. A composition as claimed in claim 1, wherein said diorganopolysiloxane (A) is a trifluoropropylalkylpolysiloxane represented by the following formula:

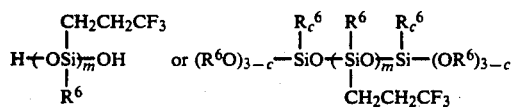

wherein groups $R^6$, which may be the same or different, each represent an alkyl group having up to 6 carbon atoms, c is an integer of 0 to 1, and m is a positive integer.

3. A composition as claimed in claim 1, wherein said organosilicon compound (C) is represented by the general formula (1) wherein $R^1$ and $R^2$ each represent a hydrogen atom or an alkyl group having up to 6 carbon atoms, $R^3$ represents an alkyl group having up to 8 carbon atoms, and $R^4$ represents an alkyl group or alkoxyalkyl group having up to 8 carbon atoms.

4. A composition as claimed in claim 1, wherein said organosilicon compound (C) is blended in an amount of 1 to 20 parts by weight per 100 parts by weight of the organopolysiloxane.

5. A composition as claimed in claim 1, wherein said filler (B) is blended in an amount of 1 to 400 parts by weight per 100 parts by weight of the organopolysiloxane.

6. A cured product obtained by curing a composition as claimed in claim 1.

* * * * *